United States Patent [19]

Millington

[11] Patent Number: 4,555,124

[45] Date of Patent: Nov. 26, 1985

[54] TROLLEY FOR USE WITH A WHEELCHAIR

[75] Inventor: Michael J. Millington, Eastleigh, England

[73] Assignee: Handicart Limited, New Malden, England

[21] Appl. No.: 529,699

[22] Filed: Sep. 6, 1983

[30] Foreign Application Priority Data

Sep. 7, 1982 [GB] United Kingdom ............... 8225515

[51] Int. Cl.⁴ ............................................. A61G 5/02
[52] U.S. Cl. ..................... 280/289 WC; 280/33.99 A; 297/DIG. 4; 403/43
[58] Field of Search ............... 280/289 WC, 33.99 A, 280/242 WC, 647; 180/907; 297/DIG. 4; 403/43

[56] References Cited

U.S. PATENT DOCUMENTS

| 2,556,121 | 6/1951 | Thomas | 280/289 WC |
| 3,496,800 | 2/1970 | Brezinski | 403/43 X |
| 3,999,778 | 12/1976 | Markiel | 280/289 WC |
| 4,305,601 | 12/1981 | Berge | 280/289 WC |
| 4,471,972 | 9/1984 | Young | 280/289 WC |
| 4,484,755 | 11/1984 | Houston | 280/289 WC |

Primary Examiner—Joseph F. Peters, Jr.
Assistant Examiner—Charles R. Watts
Attorney, Agent, or Firm—Frost & Jacobs

[57] ABSTRACT

A trolley for use by invalids which can be attached to the frame of a wheelchair, and comprising a frame with wheels and supporting a load carrying portion and clamping arms attached to the frame members and provided with clamps for attaching the trolley to the wheelchair frame.

12 Claims, 9 Drawing Figures

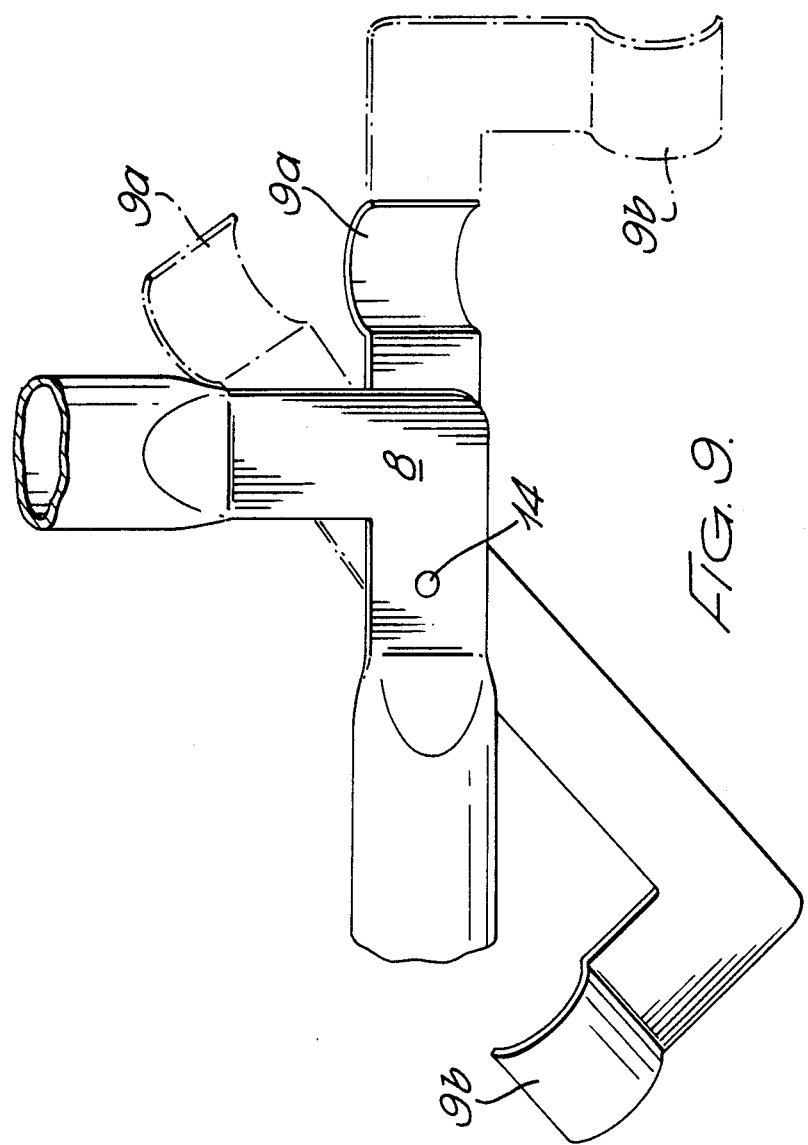

TROLLEY FOR USE WITH A WHEELCHAIR

This invention relates to a trolley for use with wheelchair.

An invalid who is confined to a wheelchair encounters many problems in performing everyday tasks. One particular problem arises when such an invalid wishes to propel and manoeuvre a second vehicle whilst simultaneously operating his own wheelchair. If the invalid concentrates on moving his wheelchair and attempts to propel the second vehicle by nudging it from behind with his wheelchair, then he has very little control over the second vehicle. Similarly, if the invalid concentrates on propelling the second vehicle he has difficulty in simultaneously moving his wheelchair and is not in full control of the latter. Both of these situations could prove dangerous both for the invalid and any other people who may be in the vicinity.

One occasion when this problem arises is, for instance, when such an invalid goes shopping in a supermarket and wishes to use a shopping trolley. In this case not only does the invalid have to propel the trolley and his wheelchair in confined spaces, but he also has the further task of loading the trolley with goods whilst maintaining control over the two vehicles.

It is thus an object of the present invention to obviate these problems by providing a trolley which can be moved in conjunction with a wheelchair in a controlled manner and with little additional effort on the part of the invalid over that involved in propelling and guiding his wheelchair.

According to the present invention, there is provided a trolley for attachment to a wheelchair comprising a frame to which is attached a plurality of jockey wheels which are rotatable about a horizontal axis and capable of swinging about a vertical axis, a load carrying portion supported on the frame and two clamping arms each provided with a clamp for attaching the trolley to the frame of the wheelchair, and wherein at least one of the clamping arms is adjustably secured to a frame member of the trolley so that the trolley may be attached to wheelchairs of various different widths.

Preferably, one of the clamping arms is fixed to a frame member of the trolley and the other is pivotally attached to a frame member of the trolley.

In order to clamp the trolley to a wheelchair, it is preferred that the clamping arms are connected to each other by a twist grip which is adjustable in length. This may comprise two externally threaded rods, one connected to each clamping arm, and themselves connected by an internally threaded grip sleeve.

The clamping arms may be generally tubular but with a flattened area to which one end of a clamp may be secured.

Two embodiments of the invention will now be described with reference to the accompanying drawings in which:-

FIG. 9 is a detailed perspective elevation of two clamps attached to a clamping arm with their alternative positions shown in chain lines.

Figure 1:
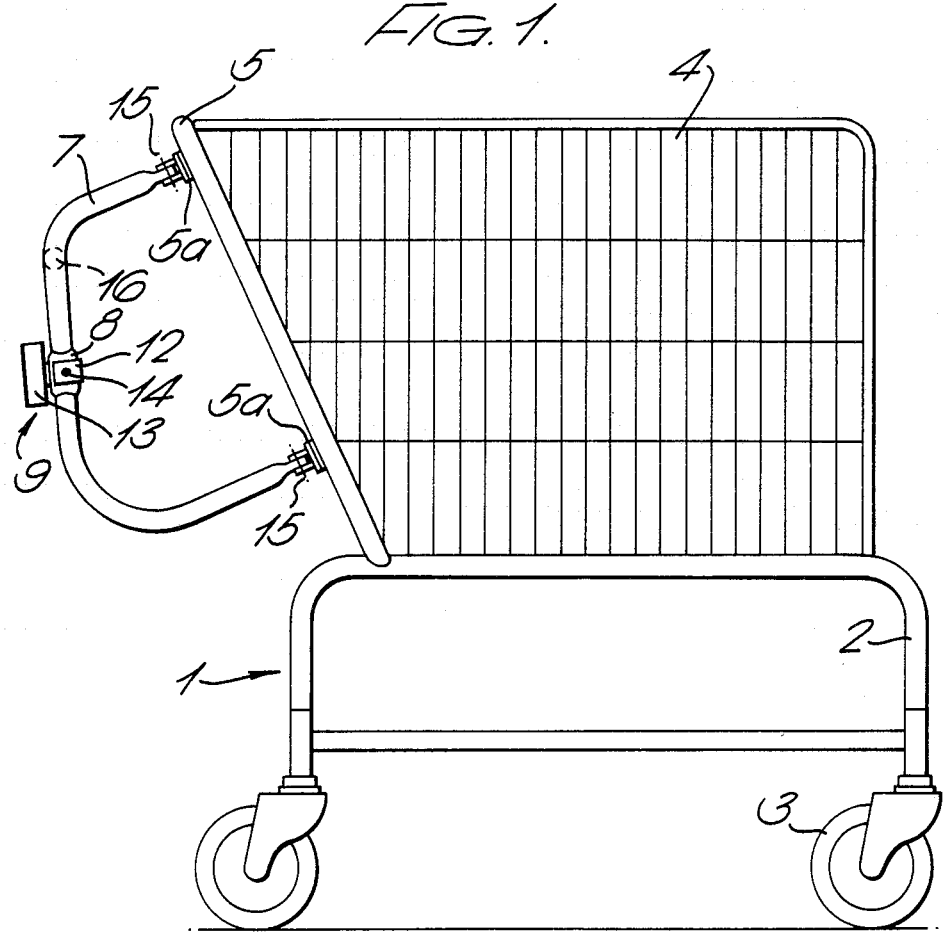
FIG. 1 is a side view of a trolley according to a first embodiment of the invention.
Figure 2:
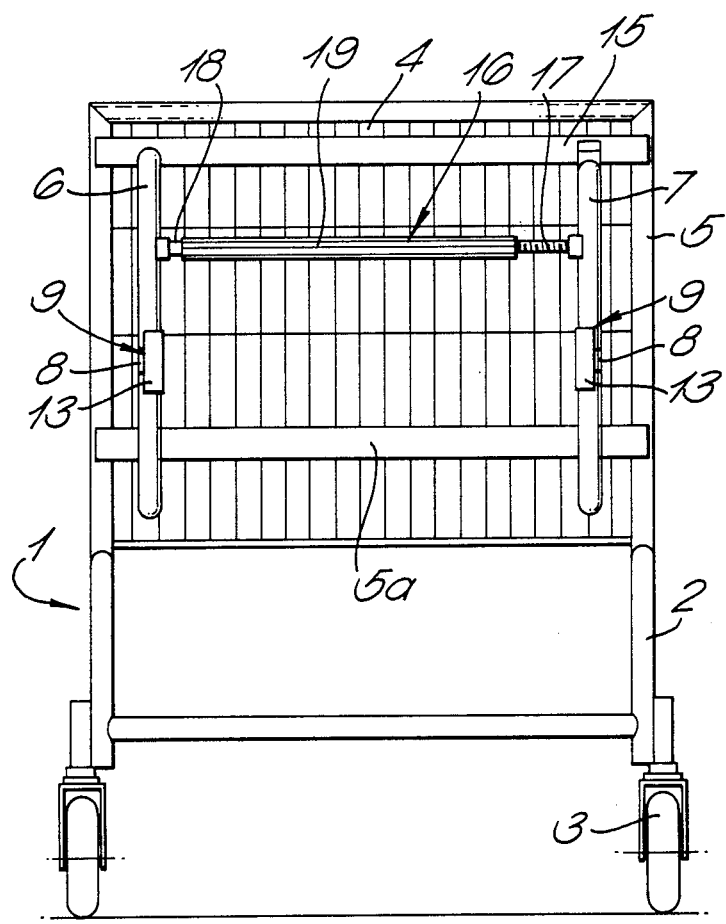
FIG. 2 is an end view of the trolley of FIG. 1.

Referring to FIGS. 1 and 2 of the drawings, the trolley has a base portion 1 consisting of a rectangular frame 2 supported at each corner on four jockey wheels 3 which are rotatable about a horizontal axis and can swivel in known manner about a vertical axis.

Figures 3, 4:
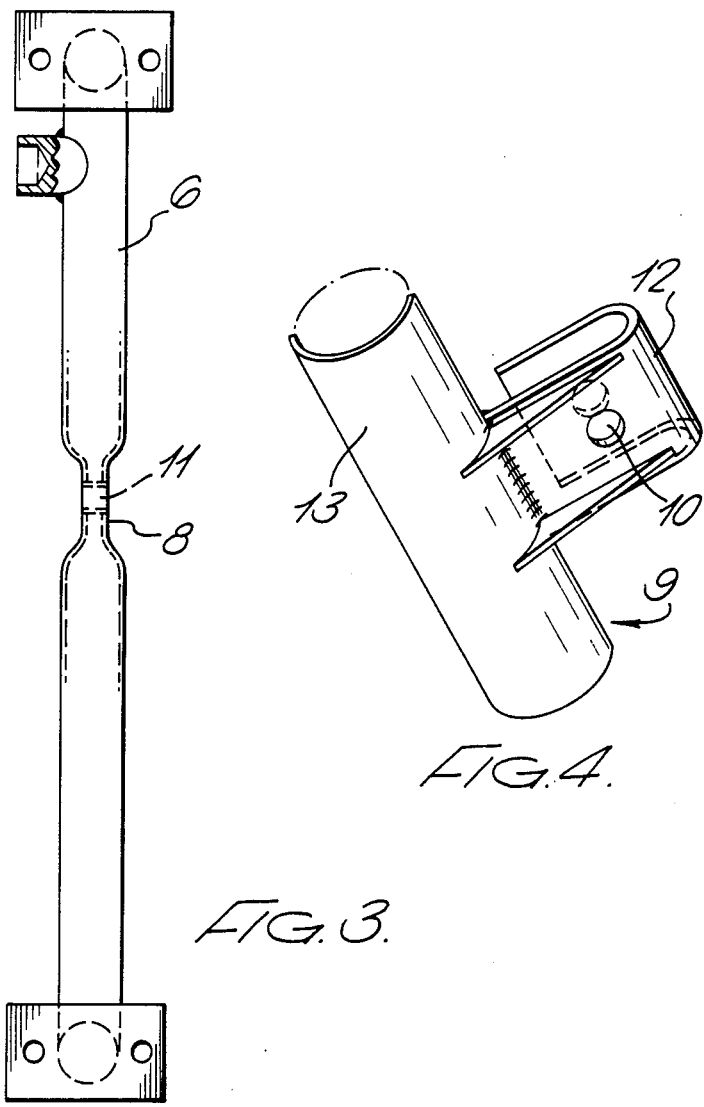
FIG. 3 is an end view to a larger scale of a clamping arm for the trolley of FIGS. 1 and 2.
FIG. 4 is a perspective view of a clamp for fitting to the arm of FIG. 3.

A load carrying basket 4 is attached to the frame 2 and two frame members 5 are provided at one end of the basket 4. Two clamping arms 6 and 7 are attached to cross frame members 5a joining the frame members 5. The arms 6 and 7 are generally tubular and formed so as to be approximately U-shaped with the free ends of the arms of the U's connected to the members 5a but have a small flattened area 8 at approximately their midpoint, as shown in FIGS. 1 and 3, through which there is a hole 11.

A clamp 9 (see FIG. 4) consisting of an elongated portion 13 which is roughly semi-circular in cross-section joined to a U-shaped portion 12 through which there is a hole 10 secured to each clamping arm by placing the U-shaped portion of the clamp around the flattened area 8 of the clamping arm, aligning holes 10 and 11 and placing a securing member 14 through the holes. The semi-circular portions 13 of the clamps remain free for attachment to the frame of the wheelchair, and in the illustrated construction, the concave faces of the semi-circular portions 13 face outwards.

The clamping arm 6 is rigidly fixed to the cross frame members 5a and clamping arm 7 is pivotally attached for movement in a horizontal plane at attachment points 15 to the members 5a. The arms 6 and 7 are connected to each other by a horizontal twist grip 16.

Figure 5:
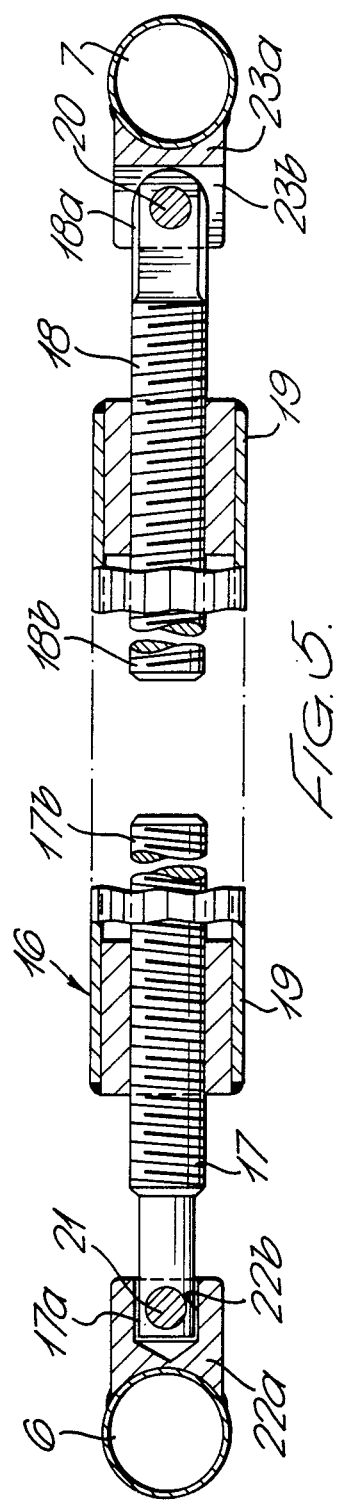
FIG. 5 is a detailed sectional elevation of a twist grip for either embodiment of trolley.

The construction of the twist grip is shown in detail in FIG. 5. It is of a largely standard design, comprising two externally screw-threaded rods 17 and 18 connected respectively at one end 17a, 18a to arms 6 and 7, their other ends 17b and 18b being located within an externally roughened, internally threaded sleeve 19. The end 17a is cylindrical and fits into a cylindrical socket 22b in a mounting block 22a which is attached to fixed clamping arm 6. It is held in place by securing member 21. The end 18a is flattened and fits between two flanges 23b which are attached to mounting block 23a which in turn is attached to pivotable clamping arm 7. The end 18a is secured between flanges 23b by securing member 20. Rod 17 has a left-handed screw thread and rod 18 has a right-handed screw thread so that when the sleeve 19 is turned, the length of the twist grip is altered, and thus the distance between the fixed clamping arm 6 and the pivotable clamping arm 7 is altered. The mounting of the end 18a of rod 18 between flanges 23b allows the rod to pivot about securing member 20 thereby relieving the strain placed on the rod as the length of the twist grip is altered and therefore prevents the rod from bending or breaking. Thus the twist grip provides a means of altering the relative positions of the two clamping arms whilst at the same time holding the pivotable arm rigid once a desired position has been reached.

To secure the trolley to the frame of a wheelchair, the twist grip would first be adjusted so that the relative distance between the two clamping arms is less than the distance between the components of the wheelchair frame e.g. the arm rest front supports to which the clamping arms are to be secured. The semi-circular portion 13 of the clamp 9 attached to the fixed clamping arm would be located against the inside of one component of the wheelchair frame and the twist grip would then be expanded by turning the sleeve 19 until the semi-circular portion 13 of the clamp 9 attached to the pivotable clamping arm fitted snugly against the inside of the other component of the wheelchair frame. The trolley would then be secured to the frame of the wheelchair.

In the alternative, the clamps could be made to engage the outside of the components of the wheelchair frame to which they were to be attached.

Figure 6:
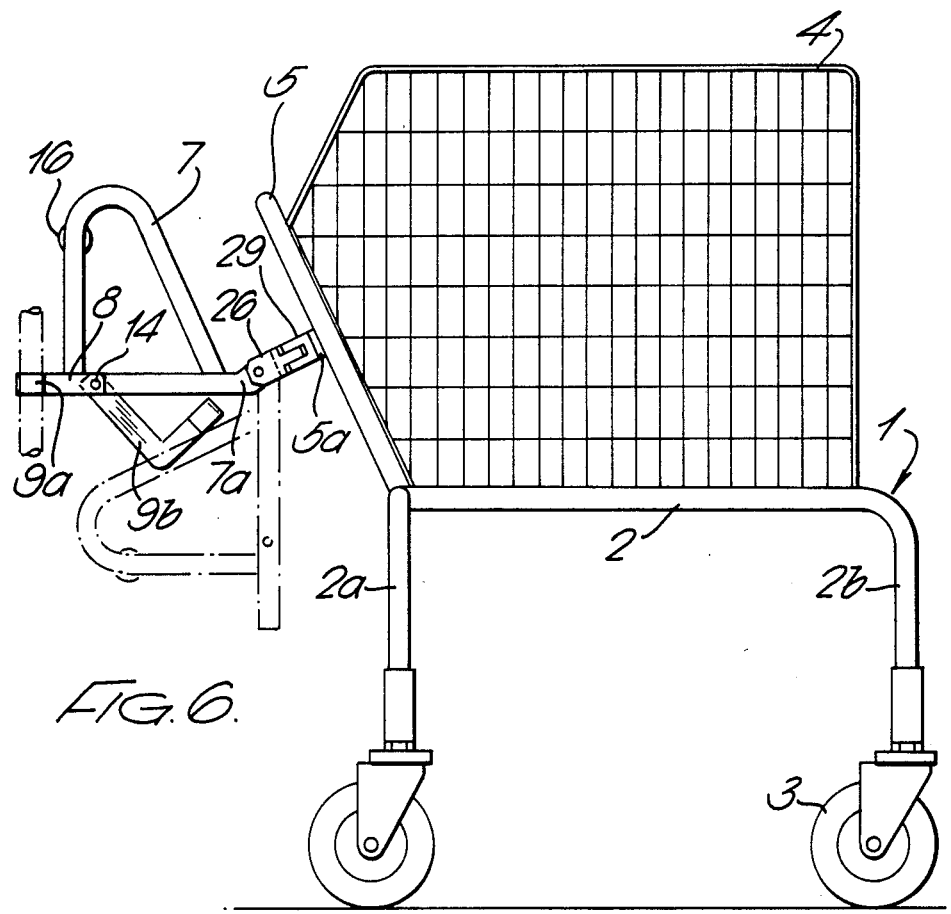
FIG. 6 is a side view of a trolley according to a second embodiment of the invention.
Figure 7:
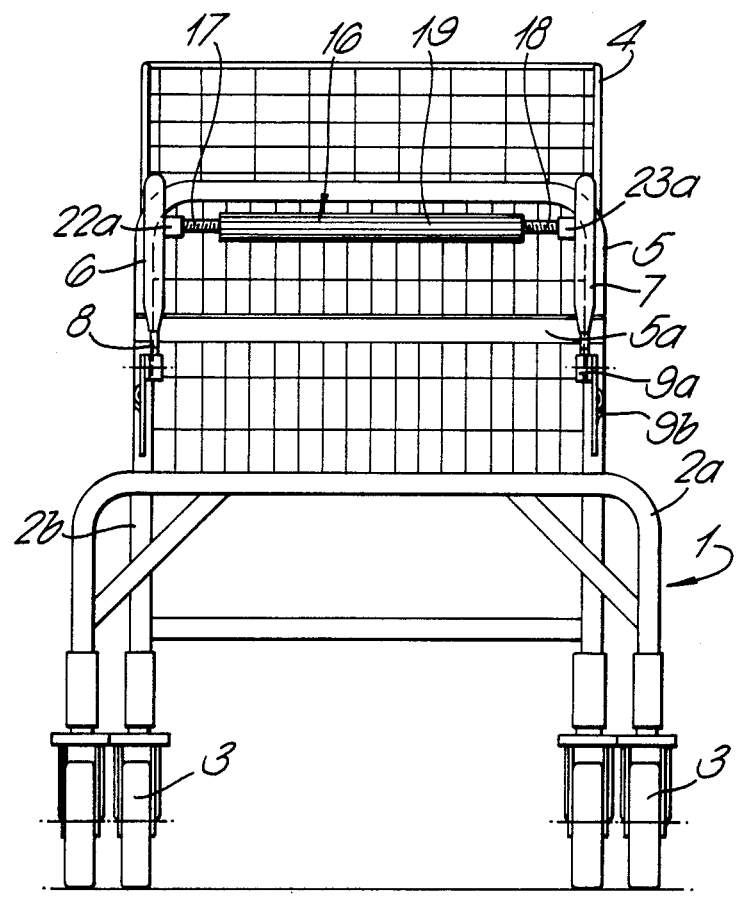
FIG. 7 is an end view of the trolley of FIG. 6.

In an alternative embodiment, as shown in FIGS. 6 and 7, parts which are the same as or equivalent to those of the first embodiment have the same reference numerals. As in the first embodiment the trolley has a rectangular sub-frame 2, 2a, 2b and four jockey wheels 3, but the rear portion 2a of the sub-frame is wider than the front portion 2b of the sub-frame and therefore the rear pair of wheels, that is, those which are closest to the wheelchair, are spaced further apart than the front pair of wheels. This particular wheel arrangement enables the trolley to accommodate all sizes of wheelchair.

The top of the load carrying basket 4 is lower at the rear of the trolley than at the front and sides to facilitate loading. The two rear frame members 5 are however connected together by a single cross frame member 5a.

Figure 8:
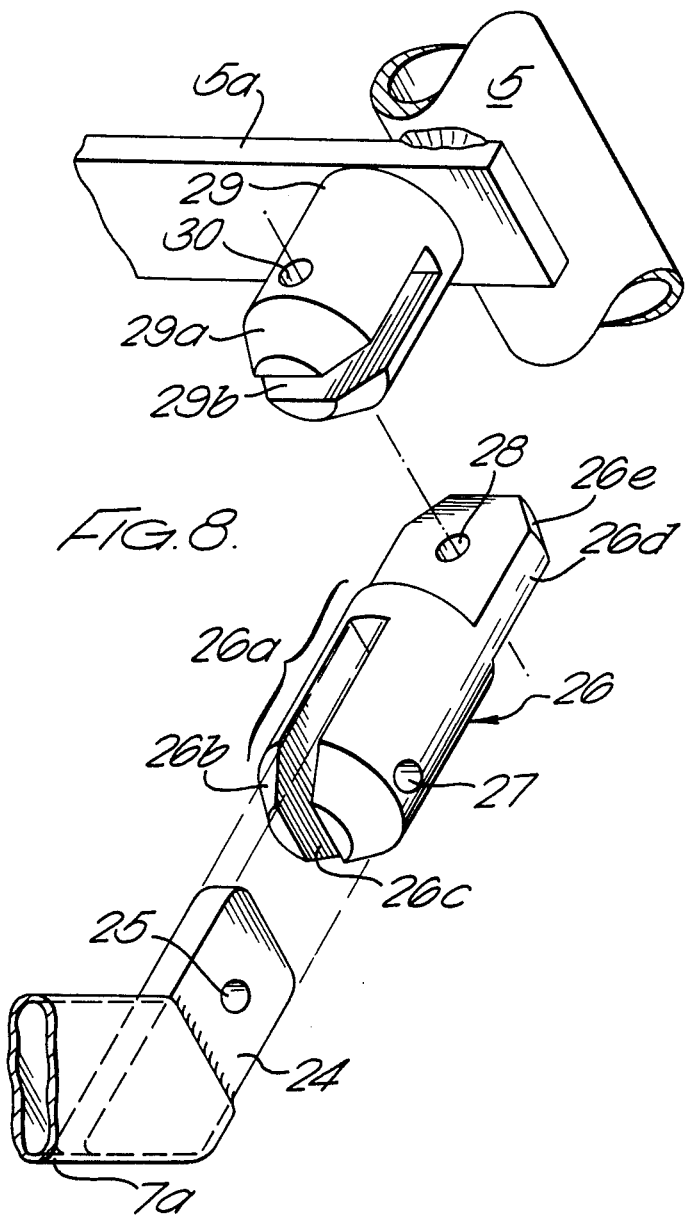
FIG. 8 is an exploded view of a hinge arrangement for connecting a clamping arm to a frame member.

The generally tubular fixed and pivotable clamping arms 6 and 7 are formed in the approximate shape of a right-angled triangle. A small area 8 around the "right-angle" of each clamping arm is flattened to facilitate attachment of clamps 9a and 9b. One limb of each clamping arm 7 is extended at its end 7a furthest from the right angle for connection to cross frame member 5a. This extended portion 7a is also flattened, as shown in FIG. 8, and envelopes one end of a flat, trapezoid member 24 through which there is a hole 25. The longitudinal axis of trapezoid member 24 lies at about 30° to the longitudinal axis of the end portion 7a of the clamping arm.

In the case of pivotable arm 7, trapezoid member 24 is pivotally connected to hinge member 26, as shown in FIG. 8. Hinge member 26 consists of a generally cylindrical portion 26a which has a bevelled end 26b and includes a slot 26c of rectangular transverse section which opens from end 26b and a flat generally rectangular lug 26d with a chamfered end 26e whose plane lies at right angles to the plane of slot 26c. A hole 27 passes through cylindrical portion 26a at right angles to the plane of slot 26c and a hole 28 passes through lug 26d in the same plane as that of slot 26c. A further generally cylindrical member 29 extends from cross frame member 5a. Member 29 has a bevelled end 29a and a slot 29b of rectangular transverse section which opens from end 29a. A hole 30 passes through member 29 at right angles to the plane of slot 29b. The planes of slots 26c and 29b are orthogonal to each other.

The hinge system which attaches the clamping arm to the trolley is assembled by inserting trapezoid member 24 into slot 26c, aligning holes 25 and 27 and placing a securing member through the holes. Lug 26d is then inserted into slot 29b, aligning holes 28 and 30, and a securing member placed through the holes. This arrangement thus allows clamping arm 7 to pivot in a vertical plane about an axis through holes 25 and 27 and to pivot in a horizontal plane about an axis through holes 28 and 30.

Similarly, fixed clamping arm 6 envelopes another trapezoid member which is also provided with a hole. However, in place of members 26 and 29, a single, elongate, generally cylindrical member 2 extends from cross frame member 5a. This has a bevelled end and a slot identical to that shown for member 26. Thus the trapezoid member can fit into this slot in the manner described above thereby enabling clamping arm 6 to pivot in a vertical plane. Movement in a horizontal plane, however, is prevented by the absence of a second pivot point at right angles to the first pivot point. The arms 6 and 7 are connected to each other by horizontal twist grip 16, as described earlier, and normally hang down when not in use, as shown by the dotted lines in FIG. 6, thereby facilitating storage of the trolleys.

Two clamps 9a and 9b are attached to the flattened area 8 of each arm 6, 7 by means of a securing member 14 which passes through holes in the clamps and the flattened areas. Clamp 9a is considerably shorter than clamp 9b and consists of a flat strip which is bent at one end to form a portion which is roughly semi-circular in cross-section and has a hole through its other end. Clamp 9b consists of an L-shaped strip (see FIG. 9), the shorter limb of which is bent at the end to form a portion which is roughly semi-circular in cross-section. A hole is positioned towards the end of the longer limb. When attached to arms 6, 7, the concave faces of the semi-circular portions of clamps 9a face outwards whereas those of clamps 9b face inwards. Only one set of clamps, either the short clamps 9a or the long clamps 9b, is used at any one time. Thus the clamps are attached to the arms in such a way that when one set of clamps is in use, the other set is pushed safely out of the way, as shown in FIG. 9. The short clamps are intended for use on wheelchairs with full arm rest frames whereas the long clamps are intended for use on wheelchairs without full arm rest frames or half frames.

To secure the trolley to a wheelchair by means of the short clamps 9a, the wheelchair is first positioned in front of the clamping mechanism which is then raised from its rest position by lifting the twist grip. The twist grip is then adjusted so that the distance between the two clamping arms is less than the distance between the arm rest frames and the short clamps are then drawn into the inside of the arm rest frames above the seat. Once the twist grip has been positioned at the desired height above the user's legs, the twist grip is expanded by turning the sleeve until the clamps firmly engage the arm rest frames.

To secure the trolley to a wheelchair by means of the long clamps 9b, the wheelchair is positioned as before and the clamping mechanism raised from its rest position. The long clamps 9b are then pulled towards the wheelchair thus pushing short clamps 9a up and out of use. The twist grip is then expanded so that the distance between the two clamping arms is greater than the width of the wheelchair and the trolley is then pulled into the position where the clamps are on the outside of the wheelchair seat frame. The twist grip is then contracted until the clamps firmly engage the seat frame.

A trolley according to this invention could be used as a shopping trolley, as mentioned above, or for a wide variety of other purposes.

What is claimed is:

1. A trolley for attachment to a wheelchair comprising a frame, a plurality of jockey wheels attached to said frame which are rotatable about a horizontal axis and are capable of swinging about a vertical axis, a load carrying portion supported on said frame, and two clamping arms, one of said clamping arms being positioned at each side of said trolley, and a clamp attached to each of said clamping arms for attaching said trolley to the frame of the wheelchair, and means adjustably attaching at least one of said clamping arms to a frame member of said trolley whereby said trolley may be attached to any one of a plurality of wheelchairs of different widths, and means in the form of a single control member, which is adjustable by using one hand only to adjust at least one of said two clamping arms in a lateral direction relative to the other of said two clamping arms to completely and securely attach said clamps of said trolley to a wheelchair.

2. A trolley according to claim 1 including means attaching said at least one clamping arm to said frame member of the trolley for pivotal movement about a generally vertical axis relative to said frame member.

3. A trolley according to claim 1, including a twist grip of adjustable length interconnecting said clamping arms.

4. A trolley according to claim 3 wherein said twist grip comprises two externally threaded rods, one attached to each of said clamping arms, and themselves connected together by an internally threaded grip sleeve.

5. A trolley according to claim 1 in which said clamping arms are generally tubular and U-shaped.

6. A trolley according to claim 1 in which said clamping arms are generally tubular and triangular in shape.

7. A trolley according to claim 1 in which said clamping arms possess a flattened area to which a clamp is secured.

8. A trolley according to claim 1 wherein each clamp includes a portion of generally semi-circular cross section for engagement with a frame member of a wheelchair.

9. A trolley according to claim 1 in which said clamping arms are vertically adjustable.

10. A trolley according to claim 1 in which said clamping arms are capable of pivotal movement in a vertical plane.

11. A trolley according to claim 1 in which two clamps are attached to each clamping arm.

12. A trolley according to claim 2 in which said clamping arms are capable of pivotal movement in a vertical plane.

* * * * *